No. 807,713. PATENTED DEC. 19, 1905.
M. BERGER.
DOUBLE TELESCOPE.
APPLICATION FILED MAY 20, 1905.

Witnesses
Paul Krüger
Fritz Sander

Inventor,
Max Berger

UNITED STATES PATENT OFFICE.

MAX BERGER, OF JENA, GERMANY, ASSIGNOR TO FIRM CARL ZEISS, OF JENA, GERMANY.

DOUBLE TELESCOPE.

No. 807,713.      Specification of Letters Patent.      Patented Dec. 19, 1905.

Application filed May 20, 1905. Serial No. 261,287.

*To all whom it may concern:*

Be it known that I, MAX BERGER, engineer, a citizen of the German Empire, residing at Carl Zeiss strasse, Jena, in the Grand Duchy of Saxe-Weimar, Germany, have invented a new and useful Double Telescope, of which the following is a specification.

The invention relates to double telescopes having means of varying the distance between the oculars by sliding the single telescopes relatively to each other. Instruments of this kind have hitherto been so constructed that one telescope is guided upon parallel bars rigidly connected with the other telescope. Such instruments are very liable to become deformed in that part consisting of the bars, rendering the double telescope useless as such, because the optical axes of the single telescopes are no longer parallel.

According to the invention herein described, this inconvenience is avoided by substituting for the bars on which one of the telescopes is guided a single guiding-piece forming a jacket which incloses the double telescope and is fitted with openings for the entrance of the rays and for the ocular-tubes. By this arrangement the instrument is so much strengthened that it is secured against deformations.

It may be considered a small drawback to the new arrangement that about the two openings of the jacket, which are necessary for the sliding telescope, guiding-surfaces must be supplied in order to prevent the penetration of dust and moisture into the interior. In stereotelescopes this defect can be removed by one-half by detaching the objective prism from the other parts of the sliding telescope, so that the telescope proper is no longer a parallel-vision telescope, but a right-angled one, and mounting it tightly into the jacket-wall. The guiding-jacket is thus completely closed at the objective end and only the opening for the ocular-tube need be made proof.

The guiding-jacket surrounding the double telescope suggests making the second telescope also similarly slidable in the jacket, and thus producing a completely symmetrical instrument whose interocular distance is regulated by sliding both telescopes simultaneously and equally nearer or farther apart.

Figure 1:
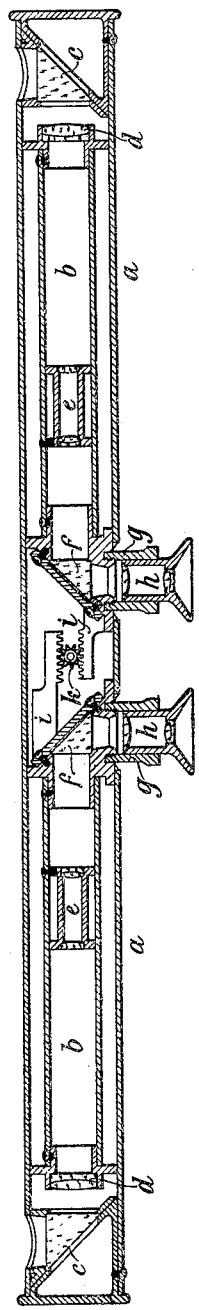
Figure 2:
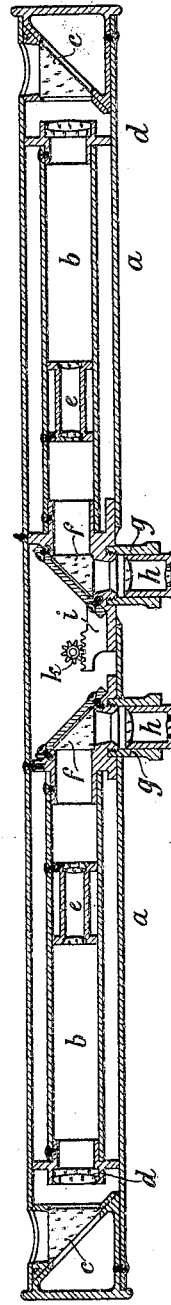

In the annexed drawings, Figure 1 is a horizontal section through a stereotelescope constructed according to the invention. Fig. 2 is a like section through another stereotelescope also constructed according to the invention.

In the tubular guiding-jacket $a$ (shown in Fig. 1) both telescopes $b$ are slidably fitted. In Fig. 2 only one telescope—the right one—is slidable. In both cases the prism $c$ in front of the objective of a sliding telescope is unslidably and tightly mounted in the closed end of the guiding-jacket.

Particularly referring, in the first place, to the perfectly symmetrical arrangement according to Fig. 1, each telescope includes besides the objective $d$ an inverting system $e$, here represented as a lens system, and an ocular-prism $f$. The ocular-tube $g$, in which the ocular $h$ is slidable, is screwed into the mounting of the prism $f$. The same prism-mounting engages with the rack $i$ the pinion $k$, whose axle is provided with a milled head outside the instrument, so that regulating the interocular distance can be performed without directly bearing on one of the ocular-tubes $g$.

The instrument shown in Fig. 2, while differing in the general arrangement in that the left of the telescopes $b$ is fixed and the right one slidable, yet shows essentially the same details as that in Fig. 1. The guiding-jacket $a$ in its left half, to which the left telescope $b$ is firmly fastened, is likewise made the mounting of the objective prism and is closed at the end. In this manner the arrangement of this double telescope also is, at least for the average interocular distance, in the main still a symmetrical one.

What I claim as my invention, and desire to secure by Letters Patent, is—

1. In a double telescope, a jacket inclosing the single telescopes and fitted with openings for the entrance of the rays and for the ocular-tubes and with guiding-surfaces for producing a sliding movement of the single telescopes relatively to each other and transversely to the direction of sight.

2. In a double telescope, the combination with a jacket inclosing the single telescopes and fitted with openings for the entrance of the rays and for the ocular-tubes and with guiding-surfaces for producing a sliding movement of the single telescopes relatively to each other and transversely to the direction of sight, of reflecting-prisms being tightly mounted into the openings of the jacket for the entrance of the rays.

3. In a double telescope a tubular jacket having two openings for the ocular-tubes at one side and two openings for the entrance of the rays at the other side, two reflecting-prisms tightly mounted into the latter openings, a right-angled telescope fastened in the jacket and another right-angled telescope slidably fitted in the jacket.

In testimony whereof I have signed my name to this specification in the presence of two subscribing witnesses.

MAX BERGER.

Witnesses:
PAUL KRUGER,
FRITZ SANDER.